United States Patent
Teh

(10) Patent No.: US 9,190,910 B2
(45) Date of Patent: Nov. 17, 2015

(54) POWER CIRCUIT

(71) Applicant: KABUSHIKI KAISHA TOSHIBA, Minato-ku (JP)

(72) Inventor: Chen Kong Teh, Tokyo (JP)

(73) Assignee: Kabushiki Kaisha Toshiba, Minato-Ku, Tokyo (JP)

( * ) Notice: Subject to any disclaimer, the term of this patent is extended or adjusted under 35 U.S.C. 154(b) by 45 days.

(21) Appl. No.: 14/014,901

(22) Filed: Aug. 30, 2013

(65) Prior Publication Data

US 2014/0285172 A1   Sep. 25, 2014

(30) Foreign Application Priority Data

Mar. 21, 2013   (JP) .................................. 2013-059036

(51) Int. Cl.
*H02M 1/00*   (2007.01)
*H02M 3/158*   (2006.01)

(52) U.S. Cl.
CPC .... *H02M 3/1588* (2013.01); *H02M 2001/0003* (2013.01); *H02M 2001/0009* (2013.01); *Y02B 70/1466* (2013.01)

(58) Field of Classification Search
CPC ................ H02M 3/156; H02M 3/157; H02M 2001/0003; H02M 2001/0012; H02M 2001/0025
See application file for complete search history.

(56) References Cited

U.S. PATENT DOCUMENTS

| | | | |
|---|---|---|---|
| 5,932,938 A * | 8/1999 | Shimamori | 307/125 |
| 6,163,143 A * | 12/2000 | Shimamori | 323/284 |
| 8,106,634 B2 | 1/2012 | Hojo et al. | |
| 8,698,467 B2 | 4/2014 | Oki | |
| 2009/0289612 A1 | 11/2009 | Hojo et al. | |
| 2010/0213911 A1 | 8/2010 | Oki | |

FOREIGN PATENT DOCUMENTS

| | | |
|---|---|---|
| JP | 03-092012 A | 4/1991 |
| JP | 06-225530 A | 8/1994 |
| JP | 2003-134810 A | 5/2003 |
| JP | 2008-079378 A | 4/2008 |
| JP | 2009-284709 A | 12/2009 |
| JP | 2010-200450 A | 9/2010 |
| JP | 2010-200517 A | 9/2010 |

OTHER PUBLICATIONS

Japanese Office Action issued on Jun. 23, 2015 in corresponding Japanese Application No. 2013-059036, along with English translatiion thereof.

* cited by examiner

*Primary Examiner* — Timothy J Dole
*Assistant Examiner* — Alan Stewart
(74) *Attorney, Agent, or Firm* — White & Case LLP

(57) ABSTRACT

According to one embodiment, the power circuit includes a first feedback loop which feedbacks information on an output voltage and a second feedback loop which feedbacks information on a load current. When the load current is smaller than a predetermined threshold value, the second feedback loop is blocked and a PWM signal is generated using data of a feedback current signal which is stored before blocking the second feedback loop.

20 Claims, 8 Drawing Sheets

POWER CIRCUIT

CROSS-REFERENCE TO RELATED APPLICATIONS

This application is based upon and claims the benefit of priority from Japanese Patent Application No. 2013-059036, filed on Mar. 21, 2013; the entire contents of which are incorporated herein by reference.

FIELD

Embodiments described herein relate generally to a power circuit which includes current mode control and light load mode control.

BACKGROUND

In the related art, a technology which switches a control mode from current mode control to voltage mode control in accordance with amplitude of a load current is disclosed. In the current mode control, a detecting circuit of an output current is required so that power consumption is larger than that of the voltage mode control. However, the current mode control has an advantage in an excellent load response characteristic.

DETAILED DESCRIPTION

In general, according to an embodiment of the present invention, a power circuit includes a first feedback loop which feedbacks information on an output voltage, a second feedback loop which feedbacks information on a load current, a control circuit which generates a PWM signal from a signal of the first feedback loop and a signal of the second feedback loop, and a switching element which is controlled to be turned on/off by the PWM signal. When the load current is smaller than a predetermined threshold value, the second feedback loop is blocked, and the PWM signal is generated using storage data obtained from the second feedback loop before blocking.

A power circuit according to embodiments will be described below in detail with reference to the accompanying drawings. The present invention is not limited by the following embodiments.

Figure 1:
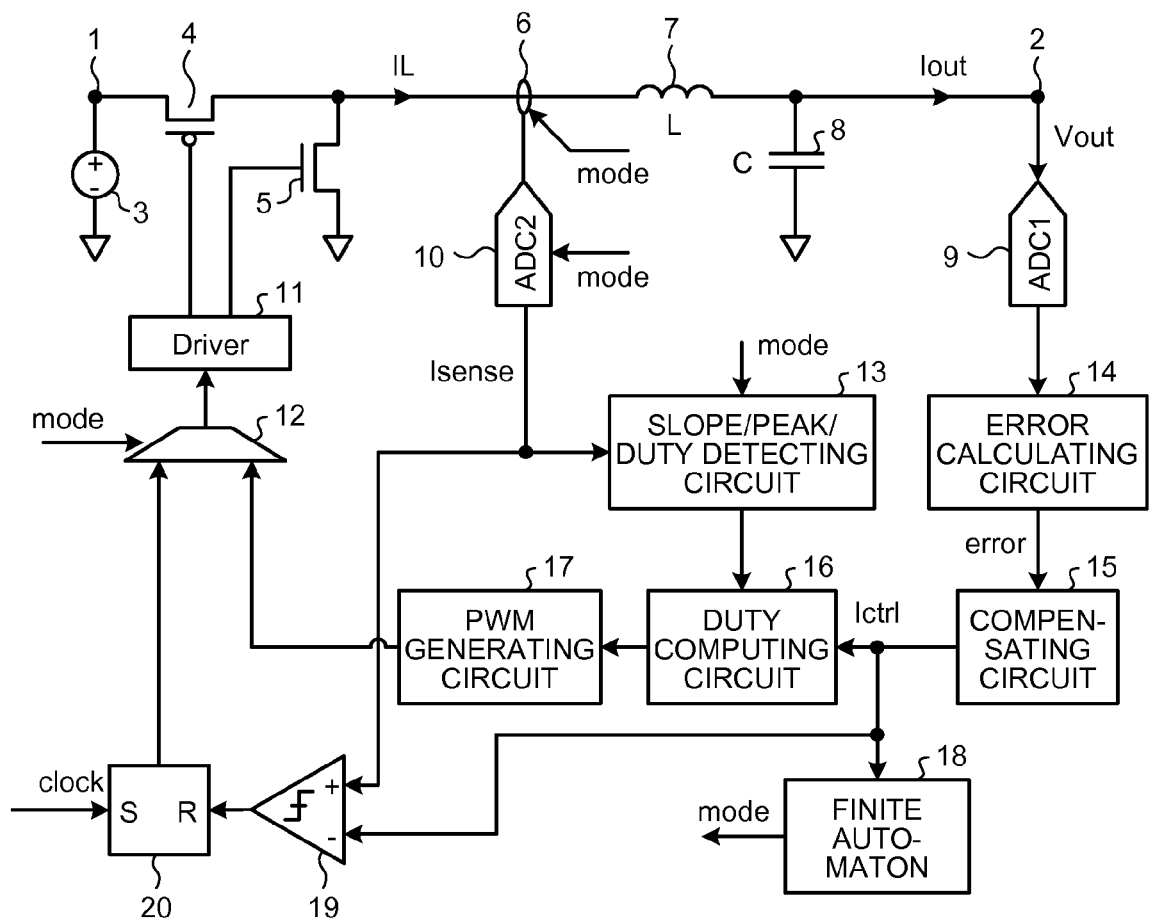
FIG. 1 is a diagram illustrating a power circuit according to a first embodiment.

FIG. 1 is a diagram illustrating a power circuit according to a first embodiment. The power circuit according to the first embodiment includes an input terminal 1 and an output terminal 2. A DC power source 3 is connected to the input terminal 1. A source electrode of a PMOS switching transistor 4 is connected to the input terminal 1. A drain electrode of the PMOS switching transistor 4 is connected to one end of an inductor 7. A drain electrode of an NMOS switching transistor 5 is connected to one end of the inductor 7 and a source electrode thereof is grounded. An output of a driver circuit 11 is supplied to gate electrodes of the PMOS switching transistor 4 and the NMOS switching transistor 5. The other end of the inductor 7 is connected to the output terminal 2. One end of a capacitor 8 is connected to the output terminal 2. The other end of the capacitor 8 is grounded. The inductor 7 and the capacitor 8 form a smoothing circuit. A predetermined load circuit is connected to the output terminal 2 but is not illustrated.

An output voltage Vout is supplied to an AD converter 9 which configures a feedback loop of the output voltage Vout and converted into a digital value. An output of the AD converter 9 is supplied to an error calculating circuit 14. The error calculating circuit 14 compares an output of the AD converter 9 and a predetermined reference voltage Vref (not illustrated) and calculates an error signal error. The error signal error is supplied to a compensating circuit 15. The compensating circuit 15 receives an output of the error calculating circuit 14 and performs proportional integral derivative (PID) control so that the output voltage Vout is equal to the reference voltage Vref. The compensating circuit 15 outputs a control signal Ictrl for the control. The compensating circuit 15 includes a memory circuit (not illustrated) in which the control signal Ictrl to be output is stored. The control signal Ictrl is supplied to a Duty computing circuit 16 and a finite automaton 18.

The finite automaton 18 stores information on a predetermined threshold value which switches an operation of the power circuit from current mode control to light load mode control. In the current mode control which feedbacks information on the load current to perform the control, the control signal Ictrl indicates a value corresponding to the load current Iout. Accordingly, the control signal Ictrl is detected to detect an amplitude of the load current Iout. The finite automaton 18 compares the control signal Ictrl with a predetermined threshold value and outputs a mode switching signal mode in accordance with a comparison result. If the control signal Ictrl which is varied depending on the load current Iout is smaller than the predetermined threshold value, the finite automaton 18 outputs the mode switching signal mode which switches the control mode of the power circuit from the current mode control to the light load mode control.

The current sensor 6 senses a current IL (hereinafter, referred to as an inductor current) that is supplied to the inductor 7. For example, the current sensor 6 is configured by a differential amplifier (not illustrated) which detects voltage drop caused by the inductance current IL at a predetermined resistor (not illustrated) which is connected to the inductor 7 in series. The output of the current sensor 6 is supplied to the AD converter 10 and converted into a digital value. An output Isense (hereinafter, referred to as a feedback current signal) of the AD converter 10 is supplied to the detecting circuit 13 and a digital comparison circuit 19. The detecting circuit 13 detects the feedback current signal Isense and also detects a slope Slope, a peak value Peak, and a Duty D of the feedback current signal Isense. The Duty D indicates a period when the PWM signal which controls an operation of the power circuit so as to make the output voltage Vout a desired voltage is at a high level. During the period of the Duty D, the PMOS switching transistor 4 is turned on and an operation which raises the output voltage Vout is performed. The inductor current IL is smoothed by the smoothing circuit configured by the inductor 7 and the capacitor 8 and output as a load current Iout. Accordingly, the information on the inductor current IL may be used as a feedback signal of the information on the load current Iout.

The detecting circuit 13 stores the slope value Slope, the peak value Peak, and the Duty D of the feedback current signal Isense in an embedded memory (not illustrated). Data indicating the slope value Slope, the peak value Peak, and the Duty D of the feedback current signal Isense detected by the detecting circuit 13 is supplied to the Duty computing circuit 16. The Duty computing circuit 16 calculates a new Duty D from the control signal Ictrl from the compensating circuit 15 and data of the slope value Slope, the peak value Peak, and the Duty D of the feedback current signal Isense from the detecting circuit 13 and supplies the new Duty D to a PWM generating circuit 17. The PWM generating circuit 17 generates a new PWM signal based on the signal output from the Duty computing circuit 16.

The output signal of the AD converter 10 is supplied to a non-inverting input terminal (+) of the digital comparison circuit 19. The control signal Ictrl from the compensating circuit 15 is supplied to an inverting input terminal (−) of the digital comparison circuit 19. By the comparison operation in the digital comparison circuit 19, if a signal from the AD converter 10 is larger than the control signal Ictrl, the signal is supplied to a reset terminal R of an RS latch circuit 20. A clock signal clock which sets a switching frequency of the power circuit is supplied to a set terminal S of the RS latch circuit 20. The PWM signal in which rising of a pulse is controlled by the clock signal clock and falling thereof is controlled by the output of the digital comparison circuit 19 is output from the RS latch circuit 20. The output of the RS latch circuit 20 is supplied to a selector 12.

An output of the selector 12 is selected by the mode switching signal mode from the finite automaton 18. If the load current Iout is larger than a predetermined threshold value, the signal from the RS latch circuit 20 is selected and supplied to the driver circuit 11. The PMOS switching transistor 4 and the NMOS switching transistor 5 are controlled to be turned on/off by the output signal of the driver circuit 11.

When the light load mode control is selected, operations of the current sensor 6 and the AD converter 10 stop by the mode switching signal mode from the finite automaton 18. For example, the differential amplifier (not illustrated) which configures the current sensor 6 and the AD converter 10 are separated from a power source supply line (not illustrated) by a switch (not illustrated) which responses the mode switching signal mode to stop the operation. By doing this, the current feedback loop which passes through the AD converter 10 from the current sensor 6 is blocked. The selector 12 selects the signal output from the PWM generating circuit 17 in response to the mode switching signal mode from the finite automaton 18 to supply the selected signal to the driver circuit 11.

A step of generating the PWM signal when the current feedback loop is blocked will be described as follows. When the mode switching signal mode is output from the finite automaton 18, the operations of the current sensor 6 and the AD converter 10 stop. The Duty D of the PWM signal, and the slope value Islope, and the peak value Ipeak of the feedback current signal Isense which are stored in the detecting circuit 13 are supplied to the Duty computing circuit 16. The Duty computing circuit 16 calculates a new Duty D based on the control signal Ictrl from the compensating circuit 15 and the signal from the detecting circuit 13. The new Duty D is supplied to the PWM generating circuit 17. The output of the PWM generating circuit 17 is supplied to the selector 12. In response to the mode switching signal mode, the selector 12 selects an output of the PWM generating circuit 17 and supplies the selected output to the driver circuit 11. The output of the driver circuit 11 is supplied to the gate electrodes of the PMOS switching transistor 4 and the NMOS switching transistor 5. The PMOS switching transistor 4 and the NMOS switching transistor 5 are controlled to be turned on/off in response to the output signal from the PWM generating circuit 17.

In the power circuit according to the first embodiment, even though the current feedback loop is blocked by the mode switching signal mode, the Duty D of the new PWM signal is calculated using data stored in the detecting circuit 13. Accordingly, in the light load mode control, it is possible to perform pseudo current mode control using data stored in the detecting circuit 13 which is generated in accordance with the control signal Ictrl from the voltage feedback loop and the output from the current feedback loop. In the light load mode control, the current sensor 6 and the AD converter 10 stop so that the power circuit with the reduced power consumption and increased conversion efficiency may be provided. When the load current Iout exceeds a predetermined threshold value, the output of the mode switching signal mode from the finite automaton 18 stops and the current feedback loop having the current sensor 6 and the AD converter 10 returns to migrate to normal current mode control.

Figure 2:
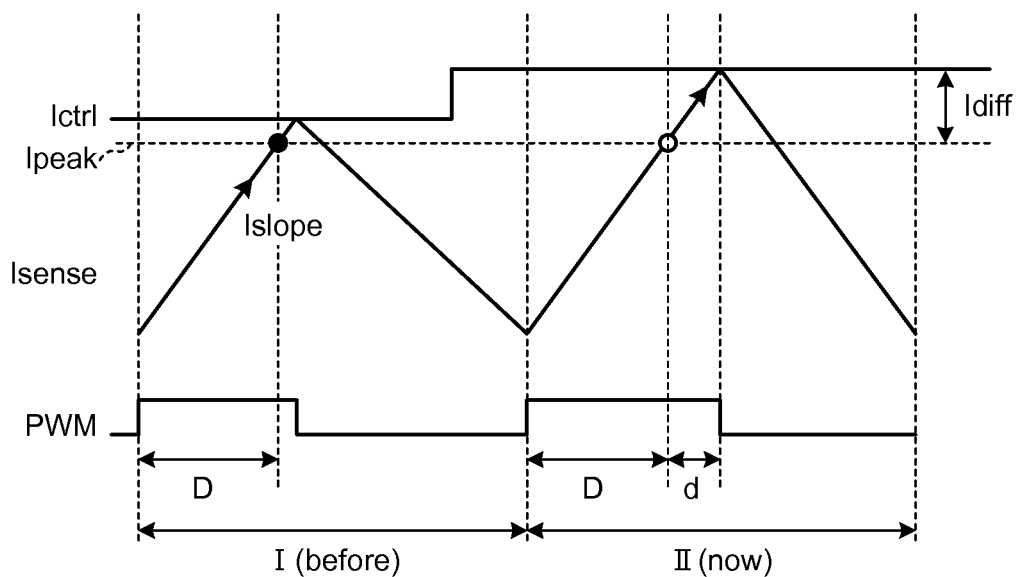
FIG. 2 is a diagram conceptually illustrating a calculating method of a Duty D of a PWM signal when a control mode is switched from current mode control to light load mode control.

FIG. 2 is a diagram conceptually illustrating a calculating method of a Duty D of a PWM signal when the control mode is switched from current mode control to light load mode control. Referring to FIG. 2, a period I (before) indicates a period of one cycle earlier switching cycle of the power circuit and a period II (now) indicates a period of a current switching cycle. An example when the control mode is switched to the light load mode control will be described in a period II (now). A bottom level of FIG. 2 indicates the PWM signal, a second level indicates the feedback current signal Isense, a dotted line of a third level indicates the peak value Ipeak of the feedback current signal Isense, and a top level indicates the control signal Ictrl. For example, because the feedback current Isense has an output signal of the AD converter 10, the actual feedback current has a digital value. However, in order to conceptually describe a calculating method, it is described that the feedback current has an analog value.

The detecting circuit 13 detects the slope value Islope, the peak value Ipeak, and the Duty D of the feedback current signal Isense in a period I (before) and stores the information (data) in the memory (not illustrated). The slope value Islope of the feedback current signal Isense, for example, may be detected by sampling the feedback current signal Isense at a predetermined timing and detecting an increased amount of the feedback current signal Isense during the sampling period. The peak value Ipeak of the feedback current signal Isense is determined such that a value of the feedback current signal Isense sampled at an earlier timing is compared with a value of the feedback current signal Isense sampled at a new timing and if the value sampled at the earlier timing is larger than the value sampled at the new timing, the value sampled at the earlier timing is determined as a peak value Ipeak. The Duty D is obtained by detecting from a sampling start time to a time when the feedback current signal Isense reaches the peak value Ipeak. In some cases, since the actual peak value of the feedback current signal Isense is different from the detected peak value Ipeak due to the sampling timing, in FIG. 2, the values are illustrated to be different from each other for the sake of convenience.

The Duty D (now) during the new period II (now) is represented by the following Equation 1.

$$D \text{ (now)} = D \text{ (before)} + d \quad (1)$$

Here, the correction data d may be obtained by the following equation (2).

$$d = I\text{diff}/I\text{slope} \quad (2)$$

Therefore, the Duty D (now) during the new period II (now) may be represented by the following Equation 3.

$$D \text{ (now)} = D \text{ (before)} + I\text{diff}/I\text{slope} \quad (3)$$

Figure 3:
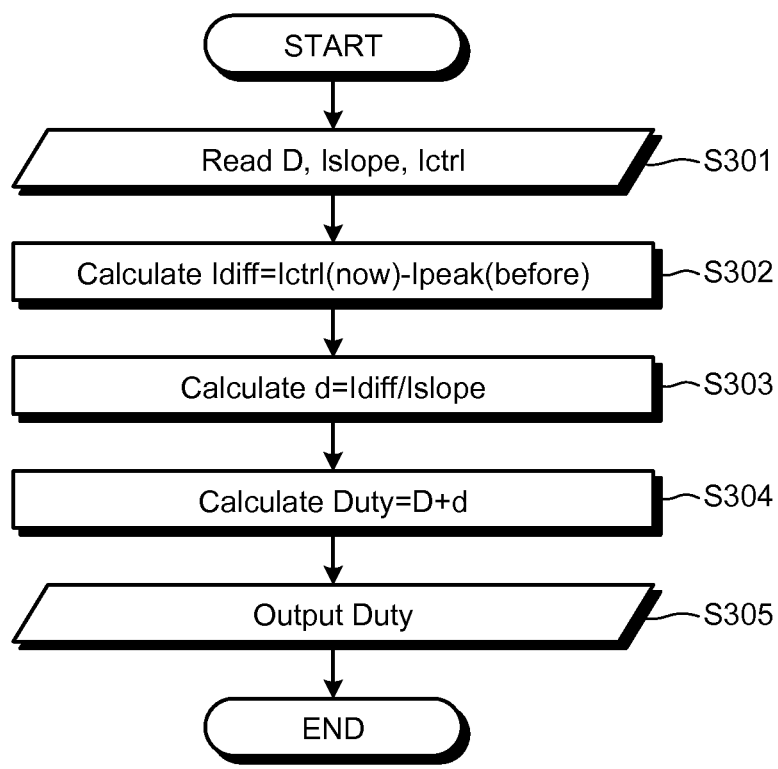
FIG. 3 is a diagram illustrating an example of a step of calculating a Duty D.

FIG. 3 illustrates a step of calculating a Duty D (now) in the Duty computing circuit 16. For the sake of convenience, a suffix before or now is attached to data to be used in order to indicate data for a corresponding period I (before) or II (now).

In step S301, a Duty D (before) of an earlier cycle, a slope value Islope (before) of the feedback current signal Isense, and a control signal Ictrl (now) of a new period II (now) which are stored in the detecting circuit 13 are read out. In step S302, a difference Idiff is calculated from the control signal Ictrl (now) and a peak value Ipeak (before) of the feedback current signal Isense of an earlier period I (before). The peak value Ipeak (before) of the feedback current signal Isense of the earlier period I (before) is stored in the detecting circuit 13. Next, in step S303, a value of the correction data d is calculated. In step S303, the value of the correction data d is obtained by dividing the difference Idiff of the control signal Ictrl (now) and the peak value Ipeak (before) of the feedback current signal Isense of the earlier period I (before) by the slope value Islope (before) of the feedback current signal Isense. The slope value Islope (before) of the feedback current signal Isense is stored in the detecting circuit 13. Next, in step S304, a new Duty D (now) is obtained. The new Duty D (now) is calculated by adding the correction data d to the Duty D (before) of the earlier period I (before). In step S305, the newly calculated Duty D (now) is output from the Duty computing circuit 16. The newly calculated Duty D (now) is supplied to the PWM generating circuit 17. The PWM generating circuit 17 generates the PWM signal based on the Duty D (now) supplied from the Duty computing circuit 16.

Even when the current feedback loop is blocked and the mode is switched to the light load mode control, the new Duty D (now) may be calculated using predetermined data of the feedback current signal Isense of the earlier switching cycle period I (before). Accordingly, the control mode may be smoothly switched to the light load mode control. Further, when the Duty D is calculated, the correction data d is calculated using the control signal Ictrl (now) and the peak value Ipeak (before) of the feedback current signal Isense which is stored before blocking the current feedback loop. However, in this case, instead of the peak value Ipeak (before) of the feedback current signal Isense, the current signal Ictrl (before) may be used. The difference between the control signal Ictrl (now) and the control signal Ictrl (before) is used as the difference Idiff to calculate the correction data d by the calculating step as the calculating step described above. The control signal Ictrl (before) may be stored in a predetermined memory (not illustrated) of the compensating circuit 15 which performs PID control, for example. Further, the control signal Ictrl (now) is smaller than the peak value Ipeak (before) of the feedback current signal Isense of the earlier period I (before) or the control signal Ictrl (before) and the difference Idiff is a negative value, the Duty D (now) is obtained by subtracting the correction data d from the Duty D (before).

Figure 4:
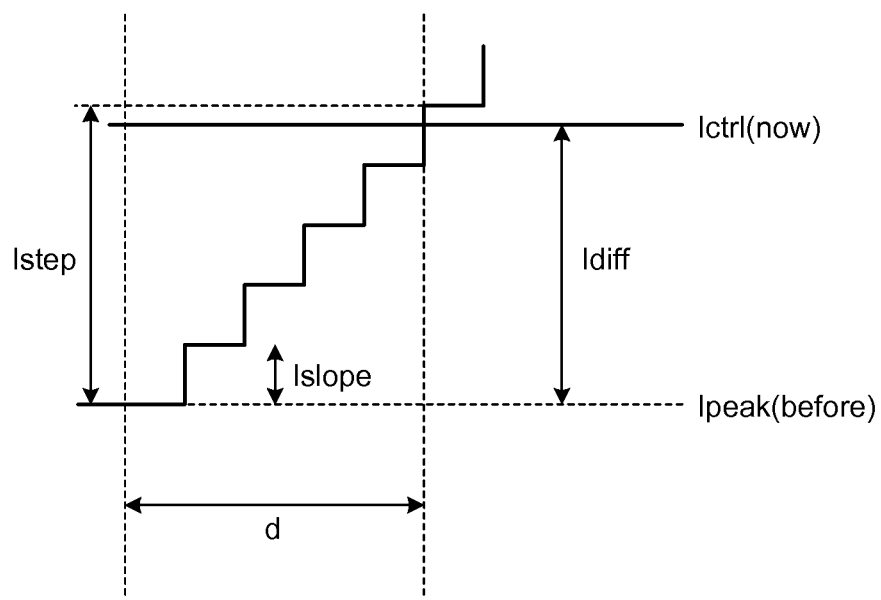
FIG. 4 is a diagram illustrating another example of a calculating method of a correction value d of the PWM signal.

FIG. 4 is a diagram illustrating another calculating method of the correction data d. In the calculating method, instead of subtraction of the correction data d, addition is used. Referring to FIG. 4, the slope value Islope of the feedback current signal Isense indicates increment for every predetermined unit time. By calculating how many the slope values Islope of the feedback current signal Isense are present in the difference Idiff between the control signal Ictrl (now) output from the compensating circuit 15 and the peak value Ipeak (before) of the feedback current signal Isense of the earlier period I (before), the correction data d may be calculated. The correction data d may be calculated using a circuit with a configuration which is simpler than that of a dividing circuit.

Figure 5:
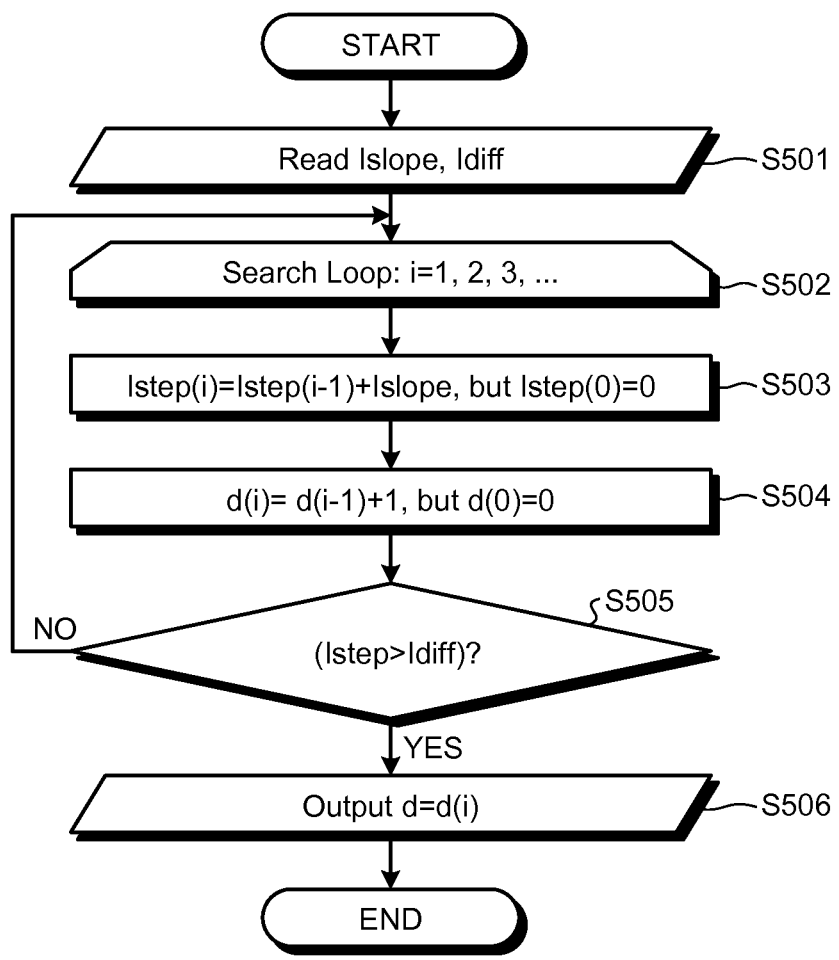
FIG. 5 is a diagram illustrating a flow of calculating the correction value d of the PWM signal.

FIG. 5 is a diagram illustrating a flow of calculating the correction data d by the calculating method of FIG. 4. In step S501, the slope value Islope (before) of the feedback current signal Isense of the earlier period I (before) and a difference Idiff between the control signal Ictrl (now) of a new period II (now) and the peak value Ipeak (before) of the feedback current signal Isense of the earlier period I (before) is read out. In step S502, an enumerative count value i is counted up one by one. In step S503, the slope value Islope of the feedback current Isense is added up one by one. In step S504, the correction data d is added up one by one unit. In step S505, a total value Istep of the slope values Islope of the feedback current signal Isense is compared with a difference Idiff between the control signal Ictrl (now) of the new period II (now) and the peak value Ipeak (before) of the feedback current signal Isense of the earlier period I (before). If the total value Istep is larger than Idiff (Yes in step S505), the correction data d (i) at that time is output in step S506. If the total value Istep is smaller than Idiff (No in step S505), the counting is continued. By the above steps, the correction data d may be obtained using a counter circuit (not illustrated) and an adding circuit (not illustrated) without using the dividing circuit.

Figure 6:
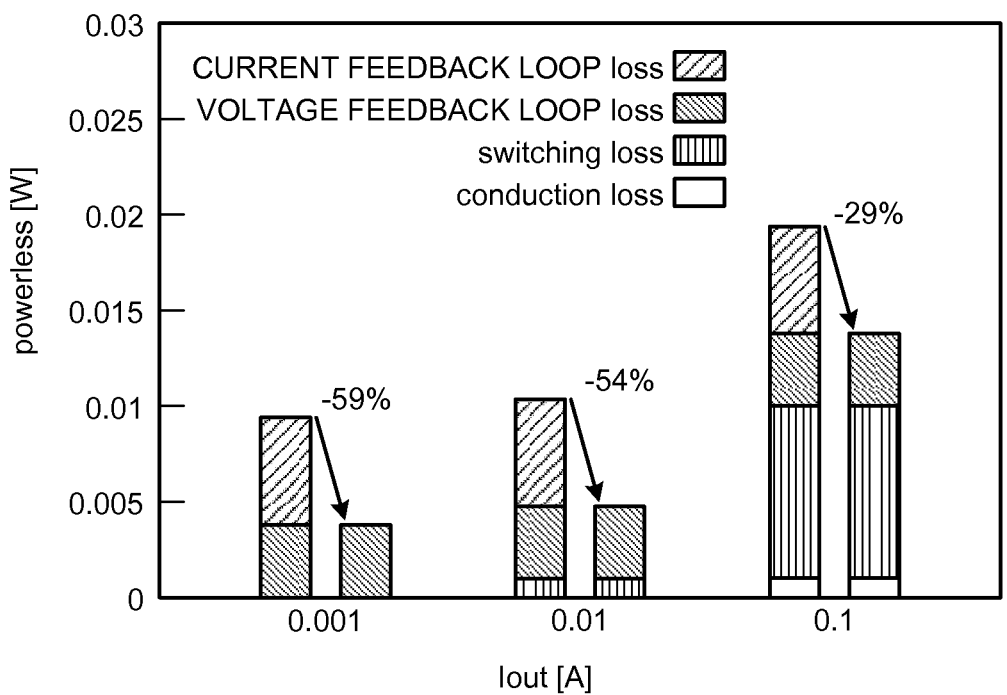
FIG. 6 is a diagram illustrating an effect of the embodiment.

FIG. 6 is a diagram illustrating an effect of the embodiment. A horizontal axis represents the load current Iout and the vertical axis represents power consumption. Referring to FIG. 6, an amount of the power consumption when the load current Iout is 0.001 A (ampere), 0.01 A (ampere), and 0.1 A (ampere) is illustrated. In FIG. 6, a current feedback loop loss indicates the power consumption by the current sensor 6 and the AD converter 10 which have been described above. A voltage feedback loop loss indicates the power consumption by the AD converter 9. A switching loss indicates the power consumption when the PMOS switching transistor 4 and the NMOS switching transistor 5 are turned on/off by capacitances at the gate electrodes. A conduction loss indicates the power consumption by an on-resistance of the PMOS switching transistor 4 and the NMOS switching transistor 5 and the power consumption by the inductor 7 and a wiring resistance. In each of bar graphs, a left side indicates a simulation result of the control by the current mode control and a right side indicates a simulation result of the control by the light load mode control. In any cases, the power consumption is significantly lowered in the control by the light load mode control. Specifically, when the load current is small, the effect is significant and the conversion efficiency is high.

Figure 7:
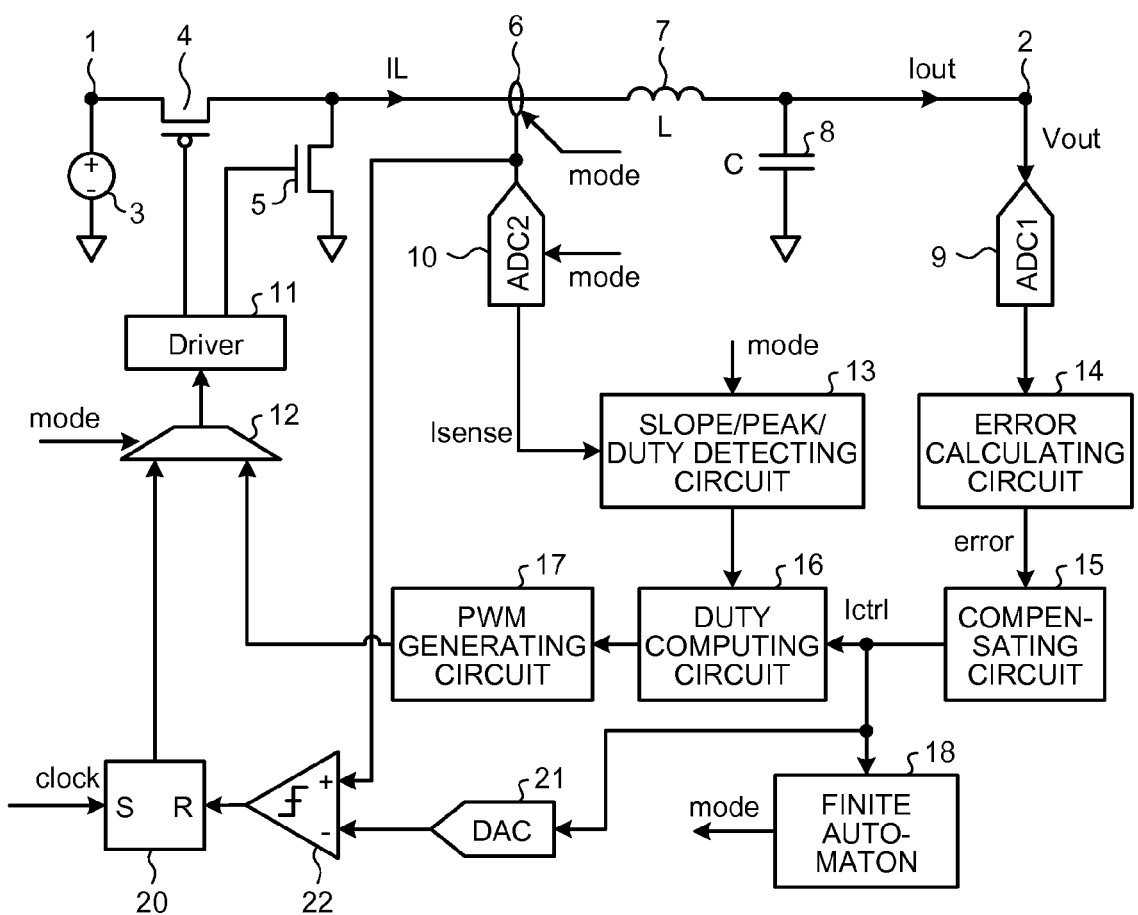
FIG. 7 is a diagram illustrating a power circuit according to a second embodiment.

FIG. 7 is a diagram illustrating a power circuit according to a second embodiment. Components corresponding to the components of the power circuit according to the above-described embodiment are denoted by the same reference numerals and the description thereof will not be repeated. In the power circuit according to the second embodiment includes an analog comparison circuit 22. An analog signal of an inductor current IL detected by a current sensor 6 is supplied to a non-inverting input terminal (+) of the analog comparison circuit 22. A control signal Ictrl which is converted into an analog value by a DA converter 21 is supplied to an inverting input terminal (−) of the analog comparison circuit 22.

In the current mode control, a driver circuit 11 is controlled by a PWM signal which is controlled by an output from a RS latch circuit 20 and a PMOS switching transistor 4 and an NMOS switching transistor 5 are controlled to be turned on/off. When the mode is switched to the light load mode control by a mode switching signal mode from a finite automaton 18, a current feedback loop including the current sensor 6 and the AD converter 10 is blocked. Similarly to the first embodiment, a Duty D (now) is calculated by a Duty computing circuit 16 using a slope value Islope (before), a peak value Ipeak (before), and a Duty D (before) of a feedback current signal Isense of an earlier period I (before) stored in a detecting circuit 13 and the control signal Ictrl (before) from a compensating circuit 15 and supplied to a PWM generating circuit 17. An output signal of the PWM generating circuit 17 and a signal of the RS latch circuit 20 are supplied to a selector 12. The output signal of the PWM generating circuit 17 and a signal of the RS latch circuit 20 are selected by the selector 12 in response to the mode switching signal mode and then supplied to the driver circuit 11.

According to the second embodiment, the control where the power consumption in the light load is reduced may be configured using the analog comparison circuit 22. The analog comparison circuit 22 may be configured by a differential amplifier (not illustrated), which may simplify a circuit configuration.

Figure 8:
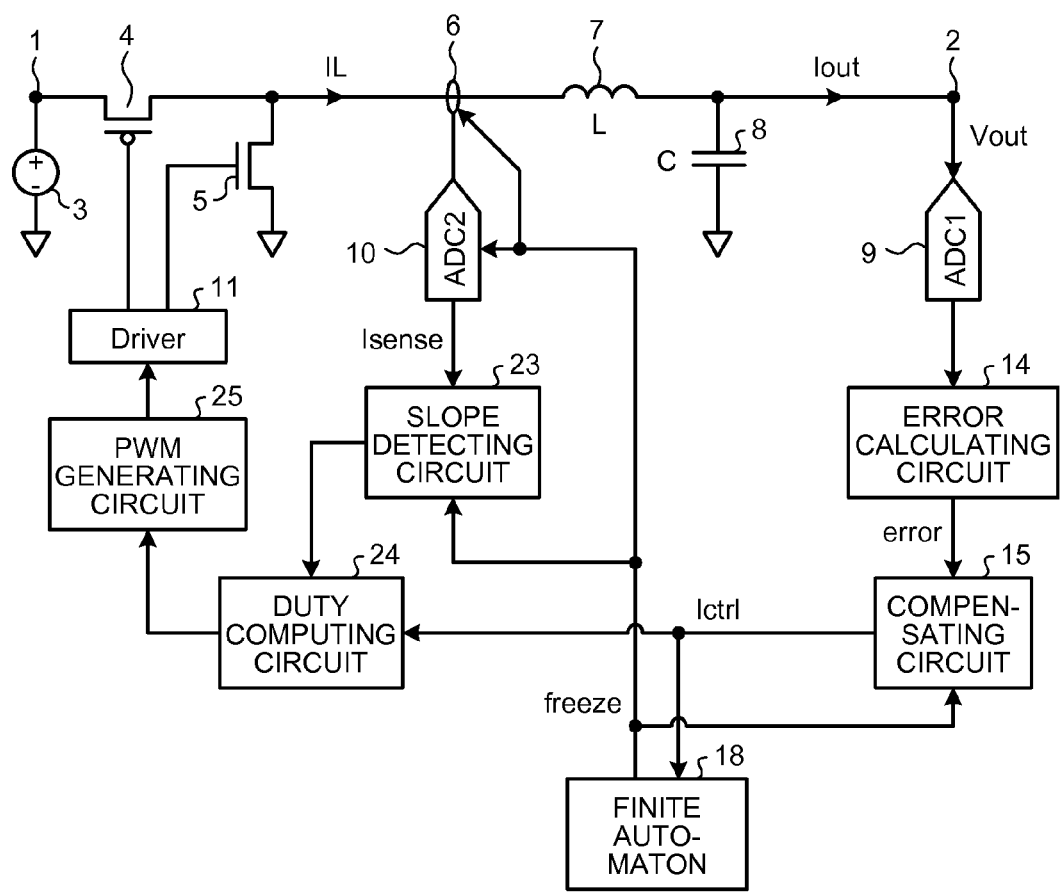
FIG. 8 is a diagram illustrating a power circuit according to a third embodiment.

FIG. 8 is a diagram illustrating a power circuit according to a third embodiment. Components corresponding to the components of the power circuit according to the above-described embodiment are denoted by the same reference numerals and the description thereof will not be repeated. In a power circuit according to the third embodiment, an output of an AD converter 10 which converts a signal from a current sensor 6 into a digital value is supplied to a detecting circuit 23. The detecting circuit 23 detects a slope value Islope of a feedback current signal Isense from a feedback current signal Isense of an AD converter 10.

A finite automaton 18 compares the control signal Ictrl from a compensating circuit 15 with a predetermined threshold value. When a load current Iout is small and the control signal Ictrl is smaller than a predetermined threshold value, the finite automaton 18 outputs a storage control signal freeze. The storage control signal freeze from the finite automaton 18 is supplied to the compensating circuit 15, the detecting circuit 23, the AD converter 10, and the current sensor 6. When the storage control signal freeze is supplied, the current sensor 6 and the AD converter 10 are isolated from the power source and the operations stop. By doing this, a current feedback loop which feedbacks information of an inductor current IL to the detecting circuit 23 is blocked. The detecting circuit 23 receives the storage control signal freeze and stores data of a slope value Islope of a feedback current signal Isense. The slope value Islope of the feedback current signal Isense may be detected by a method described above.

A Duty D (now) at the time of current mode control is represented by the following Equation (4).

$$D\text{ (now)}=D\text{ (before)}+I\text{diff}/I\text{slope} \quad (4)$$

Here, D (before) is a signal which is detected at an earlier switching cycle I (before) and stored in a memory (not illustrated) of a Duty computing circuit 24. Idiff indicates a difference between a control signal Ictrl (now) of a period II (now) at a current switching cycle and a control signal Ictrl (before) of an earlier switching cycle I (before). The slope value Islope of the feedback current signal Isense is a slope value Islope (before) of the feedback current signal Isense detected at the earlier switching cycle I (before). The slope value Islope (before) of the feedback current signal Isense is updated at every switching cycle of the power circuit.

A Duty D (now) at the time of light load mode control, that is, when the storage control signal freeze is output from the finite automaton 18 and the current feedback loop is blocked is represented by the following Equation (5).

$$D\text{ (now)}=D\text{ (freeze)}+I\text{diff}/I\text{slope} \quad (5)$$

Here, D (freeze) is data which is calculated before blocking the current feedback loop by the storage control signal freeze and stored in the Duty computing circuit 24. Idiff indicates a difference between Ictrl (now) output from the compensating circuit 15 and a control signal Ictrl (freeze) before outputting the storage control signal freeze. Ictrl (freeze) is, for example, stored in a predetermined memory (not illustrated) of the Duty computing circuit 24. The slope value Islope (freeze) of the feedback current signal Isense is data which is stored in a predetermined memory (not illustrated) of the detecting circuit 23 before outputting the storage control signal freeze. The slope value Islope (freeze) of the feedback current signal Isense and the control signal Ictrl (freeze) are stored in the predetermined memory (not illustrated) of the Duty computing circuit 24 until the storage control signal freeze is released and used to calculate Duty D (now).

In the third embodiment, the current mode control is switched to the light load mode control in response to the storage control signal freeze from the finite automaton 18. In the current mode control, the Duty D (now) is calculated using the slope value Islope (before) of the feedback current signal Isense which is updated at every switching cycle of the power circuit. In the light load mode control where the load current Iout is small, the Duty D (now) is calculated using the slope value Islope (freeze) of the feedback current signal Isense which is stored in the detecting circuit 23. Accordingly, even though the mode is switched to the light load mode control where the load current is small, the control in pseudo current mode control with reduced power consumption may be performed. Further, the storage control signal freeze is supplied from the finite automaton 18 to the compensating circuit 15 to instantaneously correct data which is stored in the compensating circuit 15 in response to the storage control signal freeze and change the control signal Ictrl. In the current mode control and the light load mode control, transfer functions for control are different. Therefore, a stable circuit operation is provided by instantaneously switching a compensating coefficient of the compensating circuit 15 in response to the switching of the control mode, that is, the storage control signal freeze. Further, according to the third embodiment, in any of the current mode control and the light load mode control, the driver circuit 11 may be controlled by the output of the PWM generating circuit 25. Therefore, a selector which selects an output in response to the switching of the control mode need not be provided so that the circuit configuration may be simplified.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power circuit, comprising:
   a first feedback loop that feedbacks information on an output voltage, the first feedback loop comparing the output voltage with a reference voltage and generating a control value corresponding to a difference between the output voltage and the reference voltage at every switching cycle;
   a second feedback loop that feedbacks information on a load current;
   a control circuit that forms a control signal from the control value of the first feedback loop and a signal of the second feedback loop; and
   a switching element that is controlled to be turned on/off by the control signal,
   wherein when the load current is smaller than a predetermined threshold value, the second feedback loop is blocked and the control signal is generated by a calculation using storage data corresponding to the load current in one switching cycle before blocking the second feedback loop and the control value in one switching cycle after blocking the second feedback loop.

2. The power circuit according to claim 1, further comprising:
   an inductor to which an output current of the switching element is supplied,
   wherein the second feedback loop returns information of an inductor current that is supplied from the switching element to the inductor as the feedback current signal.

3. The power circuit according to claim 2, wherein the second feedback loop includes a current sensor that detects the inductor current and an AD converter that converts an output of the current sensor into a digital signal, and operations of the current sensor and the AD converter stop to block the second feedback loop.

4. The power circuit according to claim 3, wherein the storage data includes data indicating a slope of the feedback current signal.

5. The power circuit according to claim 4, wherein the storage data includes data indicating a peak value of the feedback current signal and data indicating a Duty of the control signal.

6. The power circuit according to claim 5, further comprising:
   a first control mode that generates the control signal using a signal supplied via the first feedback loop and a signal supplied via the second feedback loop;
   a second control mode that generates the control signal using the storage data obtained from the feedback current signal of the second feedback loop before blocking the second feedback loop when the second feedback loop is blocked; and
   a selecting circuit that selects the control signal that is supplied to the switching element in response to the first and second control modes.

7. The power circuit according to claim 5, wherein a Duty of the control signal, when the load current is smaller than a predetermined threshold value, is calculated by correcting a Duty value of a switching cycle before blocking the second feedback loop by a correction value calculated using the storage data obtained from the feedback current signal before blocking the second feedback loop.

8. The power circuit according to claim 3, wherein when the second feedback loop is blocked, the control signal is generated using data indicating a slope of the feedback current signal obtained before blocking and when the second feedback loop operates, the control signal is generated using data indicating a slope of the feedback current signal which is updated at every switching cycle of the power circuit.

9. The power circuit according to claim 8, wherein a Duty of the control signal, when the load current is smaller than a predetermined threshold value, is calculated by correcting a Duty value of a switching cycle before blocking the second feedback loop by a correction value calculated using storage data obtained from the feedback current signal before blocking the second feedback loop.

10. The power circuit according to claim 1, wherein the second feedback loop includes a current sensor that detects the inductor current and an AD converter that converts an output of the current sensor into a digital signal, and operations of the current sensor and the AD converter stop to block the second feedback loop.

11. The power circuit according to claim 10, further comprising:
    a first control mode that generates the control signal using a signal supplied via the first feedback loop and a signal supplied via the second feedback loop;
    a second control mode that generates the control signal using the storage data obtained from the feedback current signal of the second feedback loop before blocking the second feedback loop when the second feedback loop is blocked; and
    a selecting circuit that selects the control signal that is supplied to the switching element in response to the first and second control modes.

12. The power circuit according to claim 11, wherein a Duty of the control signal, when the load current is smaller than a predetermined threshold value, is calculated by correcting a Duty value of a switching cycle before blocking the second feedback loop by a correction value calculated using the storage data obtained from the feedback current signal before blocking the second feedback loop.

13. The power circuit according to claim 10, wherein when the second feedback loop is blocked, the control signal is generated using data indicating a slope of the feedback current signal obtained before blocking and when the second feedback loop operates, the control signal is generated using data indicating a slope of the feedback current signal which is updated at every switching cycle of the power circuit.

14. The power circuit according to claim 1, wherein the storage data includes data indicating a slope of the feedback current signal.

15. The power circuit according to claim 1, wherein the storage data includes data indicating a peak value of the feedback current signal and data indicating a Duty of the control signal.

16. The power circuit according to claim 1, further comprising:
    a first control mode that generates the control signal using a signal supplied via the first feedback loop and a signal supplied via the second feedback loop;
    a second control mode that generates the control signal using the storage data obtained from the feedback current signal of the second feedback loop before blocking the second feedback loop when the second feedback loop is blocked; and
    a selecting circuit that selects the control signal that is supplied to the switching element in response to the first and second control modes.

17. The power circuit according to claim 1, wherein when the second feedback loop is blocked, the control signal is generated using data indicating a slope of the feedback current signal obtained before blocking and when the second feedback loop operates, the control signal is generated using data indicating a slope of the feedback current signal which is updated at every switching cycle of the power circuit.

18. The power circuit according to claim 17, wherein a Duty of the control signal, when the load current is smaller than a predetermined threshold value, is calculated by correcting a Duty value of a switching cycle before blocking the second feedback loop by a correction value calculated using storage data obtained from the feedback current signal before blocking the second feedback loop.

19. A power circuit, comprising:
- an input terminal to which a DC power source is connected;
- an output terminal;
- a switching element that has first, second, and third electrodes, the first electrode being connected to the input terminal;
- an inductance element whose one end is connected to the second electrode of the switching element and the other end is connected to the output terminal;
- a first feedback loop that feedbacks voltage information of the output terminal, the first feedback loop comparing the output voltage with a reference voltage and generating a control value corresponding to a difference between the output voltage and the reference voltage at every switching cycle;
- a second feedback loop that includes a current sensor that detects a current supplied to the inductance element and an AD converter that converts an output signal of the current sensor into a digital value, and feedbacks current information that is supplied to the inductance element;
- a control signal generating unit that generates a PWM signal from signals of the first and second feedback loops;
- a unit that supplies an output signal of the control signal generating unit to the third electrode of the switching element; and
- a unit that outputs a mode switching signal which blocks the second feedback loop by stopping operations of the current sensor and the AD converter when the signal of the first feedback loop is smaller than a predetermined threshold value,
wherein when the operations of the current sensor and the AD converter are stopped, the control signal generating unit generates the PWM signal by a calculation using storage data corresponding to the load current in one switching cycle before blocking the second feedback loop and the control value in one switching cycle after blocking the second feedback loop.

20. A power circuit, comprising:
- a first feedback loop that feedbacks information on an output voltage, the first feedback loop comparing the output voltage with a reference voltage and generating a control value corresponding to a difference between the output voltage and the reference voltage at every switching cycle;
- a second feedback loop that feedbacks information on a load current;
- a control circuit that forms a control signal from the control value of the first feedback loop and a signal of the second feedback loop; and
- a switching element that is controlled to be turned on/off by the control signal,
wherein when the load current is smaller than a predetermined threshold value, the second feedback loop is blocked and the control signal is generated based on a difference between the control value in one switching cycle before blocking the second feedback loop and the control value in one switching cycle after blocking the second feedback loop.

* * * * *